Aug. 23, 1949.　　　N. MORRIS ET AL　　　2,479,587
ELECTRIC HEATER
Filed Sept. 30, 1944　　　　　　　2 Sheets-Sheet 1
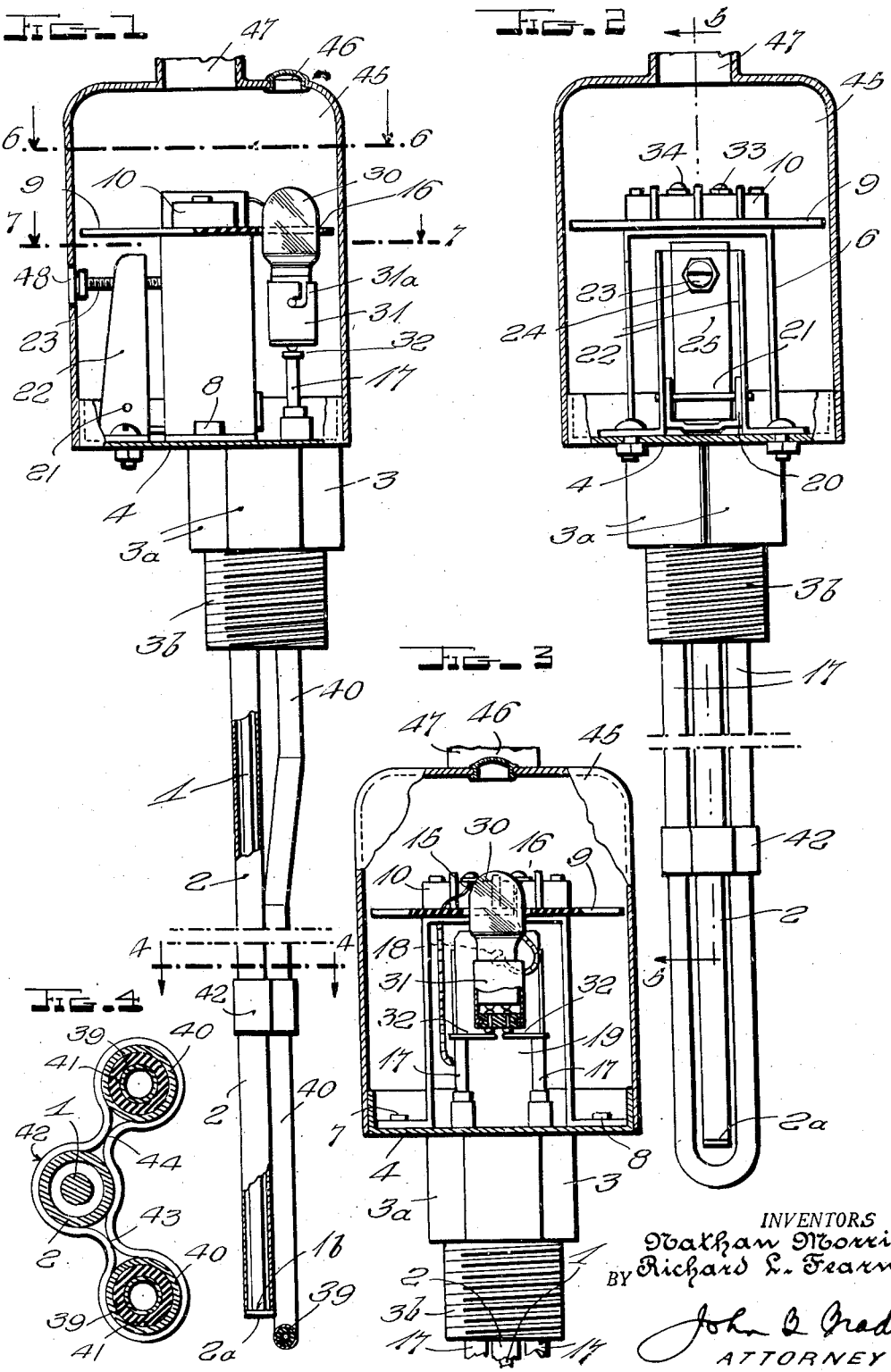
INVENTORS
Nathan Morris,
BY Richard L. Fearn,
John B. Grady
ATTORNEY

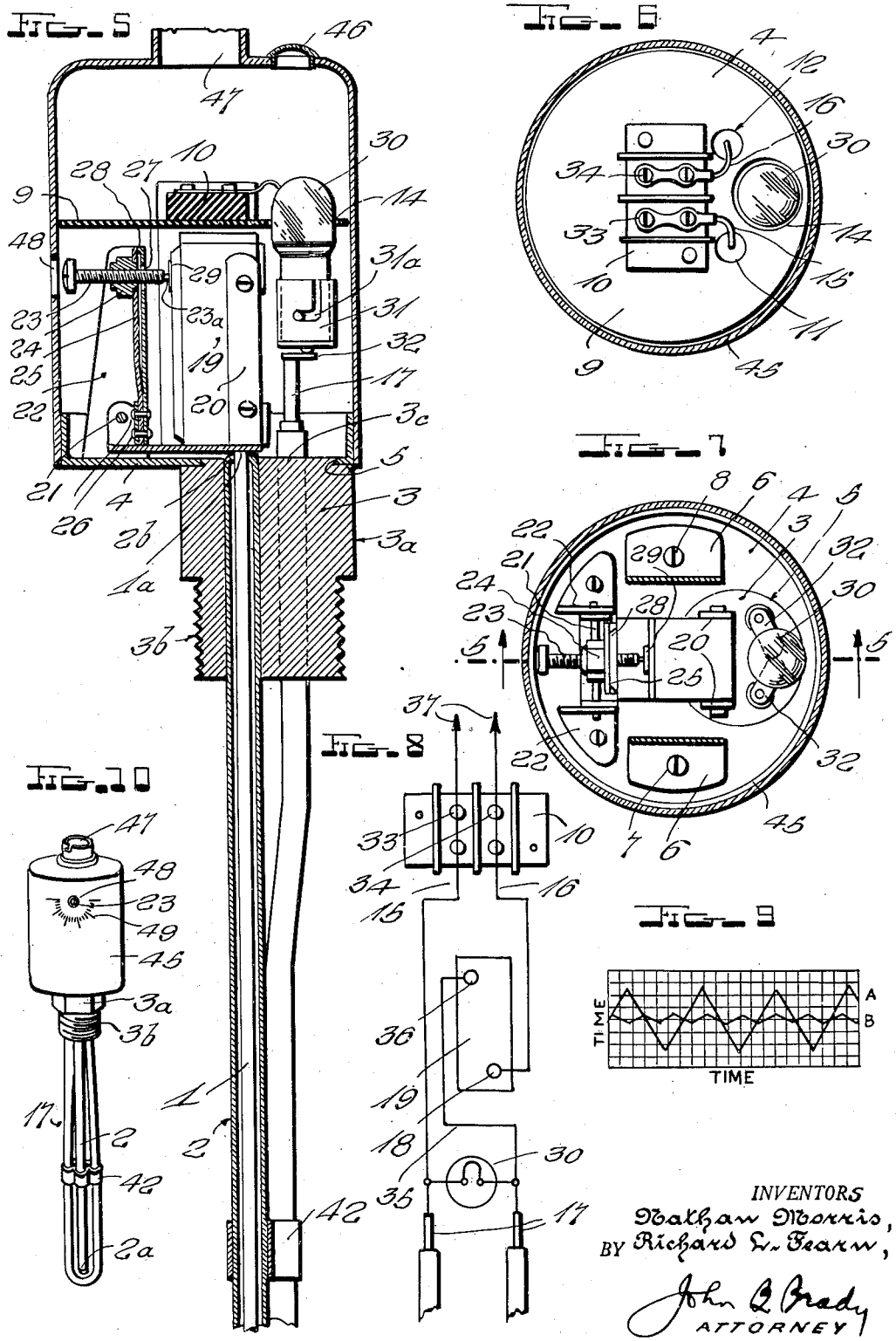

Patented Aug. 23, 1949

2,479,587

UNITED STATES PATENT OFFICE 2,479,587

ELECTRIC HEATER

Nathan Morris and Richard L. Fearn, Silver Spring, Md., assignors, by mesne assignments, to Electro Therm, Inc., Silver Spring, Md., a corporation of Maryland Application September 30, 1944, Serial No. 556,596

14 Claims. (Cl. 219—38)

Our invention relates broadly to electric heaters and more particularly to an improved construction of automatic safety immersion heater.

One of the objects of our invention is to provide a construction of electric heater and automatic control, combined in one self-contained, compact unit, ideal for installation in tanks, processing kettles, stills, sterilizers, residence water heaters, pipe lines, etc., or in any container where safe, automatic, economical, convenient, and dependable electric heat is required.

Another object of our invention is to provide an improved construction of immersion heater which when once installed and set for the desired working temperature will function accurately without human attention to maintain a body of fluid at the desired temperature, cutting on and off at required times to maintain the fluid temperature substantially constant.

Still another object of our invention is to provide a construction of immersion type electric heater so arranged that should the liquid level fall so as to expose the heating element to air, the built-in safety control will limit the temperature rise of the heater and thus protect it against overheating and burning out.

A further object of our invention is to provide an immersion type heater having a readily accessible adjusting control thereon by which the heater can be set at the desired working temperature over a range, for example, from ambient to approximately 350° F. and thenceforth continue to maintain the desired temperature of liquids within approximately plus or minus 5° F.

A still further object of our invention is to provide a simplified construction of combined automatic temperature control device and electric heater which is compact and can be screwed into a single opening in the walls of a vessel, pipe, etc., through a suitable pipe flange, bushing, or reducer coupling, with only two wires needed to connect to the current supply to the heater.

Another object of our invention is to provide a construction of electric heater in which a thermostat is intimately associated with a heating member with an adjustable thermal link interconnecting the thermostat and heating member for increasing the rate of heat conduction therebetween and suppressing the magnitude of temperature surges due to "on" and "off" operation of the heater, thereby securing closer temperature regulation.

Other and further objects of our invention reside in the improved construction of electric heater as set forth more fully in the specification hereinafter following by reference to the accompanying drawings, in which:

Figure 1 is a side elevational view partially broken away and illustrated in section showing the automatic heater unit of our invention; Fig. 2 is a side elevational view of the heater with the mounting means for the control unit and the casing broken away and shown in section looking in a direction removed 90° from the position in which the view of Fig. 1 is taken; Fig. 3 is a side elevational view of the top portion of the heater showing the control unit within the casing of the heater in a position revolved 180° with respect to the view shown in Fig. 2; Fig. 4 is a transverse sectional view on an enlarged scale taken on line 4—4 of Fig. 1 and showing the arrangement of the thermal link which interconnects the heater sections with the thermostat; Fig. 5 is a fragmentary vertical sectional view taken through the heater and control unit substantially on line 5—5 of Fig. 2 and line 5—5 of Fig. 7; Fig. 6 is a transverse sectional view taken on line 6—6 of Fig. 1 through the casing and illustrating the terminal block by which connection is made to a power circuit; Fig. 7 is a transverse sectional view taken on line 7—7 of Fig. 1 and illustrating the arrangement of control unit and pilot light; Fig. 8 is a schematic and diagrammatic view showing the circuit connections between the power source, the pilot light and the electric heater; Fig. 9 is a curve diagram illustrating the effectiveness of the thermal link shown in Figs. 1, 2, 4 and 5; and Fig. 10 is a front view of the casing of the heater showing the calibrations thereon with respect to which the adjustment means for the cut-off point of the heater may be angularly adjusted to a selected temperature at which the power circuit to the heater is interrupted.

Our invention provides an improved construction of automatic safety immersion heater which may be manufactured at relatively low cost on a quantity production basis to provide precision control wherever the temperature of fluid is to be maintained constant. We provide an electric heater element which may be immersed in the fluid whose temperature is to be controlled in association with a thermostat supported in the same mounting means that supports the heater element. The mounting means also serves as a support for an alarm or lamp and a circuit cut-out contact system which is operated when the liquid in which the heater is immersed reaches a predetermined temperature. The temperature at which the alarm or light and cut-off are operated may be selectively set.

A thermal link bridges the heating element and the thermostat and transmits heat more quickly to the thermostat than would be transmitted by the liquid, consequently the magnitude of temperature surges due to the "on" and "off" operation of the heater are greatly suppressed, resulting in closer temperature control. This principle of more speedy response of the thermostat to temperature changes is also an important factor in the prevention of burn-outs should the liquid level fall and expose the heating element to air.

Referring to the drawings in detail reference character 1 designates the thermostat rod in the automatic heater of our invention which is encased in the metallic thermostat tube 2. The metallic thermostat tube 2 is closed at the end 2a thereof by an end member that is mechanically secured to the end of the thermostat rod 1 at 1b, and is supported at the opposite end 2b thereof in the supporting member 3. The supporting member 3 is provided with flat faces 3a which may be engaged by a tool and is screw-threaded as shown at 3b to permit the heater to be tapped into a tank, processing kettle, still, sterilizer, residence water heater, pipe lines, or vat, etc. The mounting means serves as a support for the mounting plate 4 which is eccentrically disposed with respect thereto. The mounting plate 4 is apertured at 5 to receive the projection 3c which extends from the supporting member 3 through the apertured mounting plate 4 and is swaged over the mounting plate 4 to rigidly secure the mounting plate 4 in position.

The mounting plate 4 serves as a support for the inverted U-shaped bracket 6 which is secured to the mounting plate 4 by means of securing bolts 7 and 8. The inverted bracket 6 serves as a carrier for the plate of insulation material shown at 9 upon which the terminal block 10 is mounted. The plate of insulation material 9 is apertured at 11, 12 and 14. Flexible connecting leads 15 and 16 extend through the apertures 11 and 12 in plate 9. Flexible lead 15 connects to one terminal of the electric heater which I have designated at 17. Flexible lead 16 connects to terminal 18 of the micro-switch 19. The micro-switch 19 is housed within a casing of insulation material which is supported on the pivoted switch bracket represented at 20. The pivoted switch bracket is journaled about an axis 21 formed by pivoting means supported in the vertically extending bracket 22 which is carried by mounting plate 4. The vertically extending bracket 22 is rigidly connected with mounting plate 4 and is provided with an adjusting screw 23 adjacent the top thereof. Adjusting screw 23 passes through screw-threaded member 24 which is carried upon the resilient leaf spring 25 firmly secured to the bracket 22 adjacent the base thereof as shown at 26. The adjusting screw 23 extends through aperture 27 adjacent the top of bracket 22. The upper end of bracket 22 is turned at a right angle as represented at 28 and serves as a stop against which resilient leaf spring 25 normally rests. Adjusting screw 23 may be screw-threaded within screw-threaded member 24 and advanced or retracted through aperture 27 in the vertically extending bracket 22. The adjusting screw 23 has the terminus 23a thereof aligned with operating member 29 of the micro-switch 19 and constitutes an adjustable abutment for actuating operating member 29 of micro-switch 19. Thus the position of operation of micro-switch 19 may be governed by advancing or retracting adjusting screw 23.

The micro-switch 19 is normally open (in the particular heater herein described). Rod 1 is constructed of a material having a low thermal expansion in relation to tube 2. As the temperature of the thermostat elements 1 and 2 increases, the tube (in this case brass) expands to a greater extent than the rod 1 thus allowing the end of the rod 1a to reduce its extension distance through the tube at 2b and thus alter the angular position of the bracket 20 carrying micro-switch 19. Rod 1 attached at 1b to the end 2a of the tube 2 is pulled through the end 2b of the tube 2 as the material of tube 2 expands thus allowing bracket 20 to move clock-wise. The pivoted switch bracket 20 is normally retained against the rod at 1a by the reaction of the internal switch spring mechanism within micro-switch 19 through operating member 29 which is normally in pressure contact with the adjusting screw at 23a.

When the thermostat members 1 and 2 are not heated tube 2 is contracted pressing rod 1 against switch lever 29 causing a reaction pressure on operating member 29 against fixed screw 23a of sufficient amount to overcome the internal switch spring pressure within micro-switch 19 and retain its contacts in a closed position thus energizing the heater.

As the heating effect of the heaters raises the temperature of the thermostat elements 1 and 2 the tube expands more rapidly than the rod thus reducing the pressure at 2a allowing the switch spring to move member 29 outward until the switch contacts are broken thus disconnecting the heater circuit and extinguishing the indicator lamp 30.

The indicator lamp 30 is preferably of the neon tube type and serves as a glow discharge device for indicating energized condition of the heater without consuming appreciable power. The lamp 30 projects through the aperture 14 in the plate of insulation material 9 and is secured in the socket 31 by suitable means such as the bayonet slot and pin arrangement indicated at 31a. Connecting means which also serve as mechanical supports extend from the socket 31 as indicated at 32 and into the upwardly extending terminal 17 of the electric heater. The electric heater 17 connects as heretofore explained at one side to flexible lead 15 which extends through the plate of insulation material 9 to the terminal block 10 and electrically connects with the terminals 33 thereof. In order to allow for physical displacement of lead 15 and yet insure continuous and substantial insulation thereof, lead 15 is covered by a flexible bead-like refractory insulation. Terminal block 10 is also provided with terminals 34 which connect as heretofore explained through flexible lead 16 to terminal 18 of the displaceable micro-switch 19. Flexible lead 16 is likewise covered with bead-like refractory insulation. The other end of the electric heater 17 connects through flexible lead 35 with the opposite terminal 36 of the micro-switch 19 as represented more clearly in Fig. 8. The power supply to the heater which may be the customary source of 110 volt 60 cycle alternating current lighting current connects to terminal posts 33 and 34 through leads 37. Thus when micro-switch 19 is actuated, due to the elongation of thermostat tube 2 and retraction of rod 1 at 1a and the rocking of the micro-switch 19 bodily about pivot 21 and the release of abutment of operating member 29 with respect to the end 23a of adjusting screw 23, the power circuit from leads 37 is completed, closing the circuit to the heater 17 and to the pilot light 30 disposed in parallel with the leads thereof. The heater 17 is formed by the heating coil 39 wound within a metallic sheath 40 with the refractory insulation indicated at 41 disposed between the interior wall of metallic sheath 40 and the heating coil 39.

The metallic sheath 40 never becomes electrically energized because the refractory insulation 41 that separates the heating coil 39 from the metallic sheath 40 has a resistance of more than ten megohms. There is no danger of the material becoming electrically charged or the operator becoming shocked. Heaters of this type readily withstand 1000 volts.

The heating coil 39 consists of a helical coil of high-grade nickel-chromium centered in a seamless copper or steel sheath 40, with magnesium-oxide, which is an excellent electrical insulator, highly compacted between the heating coil 39 and the metallic sheath 40. The combination of small sheath diameter and high thermal conductivity of the dense refractory separating the heating coil 39 from the metallic sheath 40 enables the heater of our invention to respond instantly to the action of the thermostat. When current is turned on heating of the material surrounding the sheath begins immediately and when the current is turned off the heating stops. It is this quick heating and quick cooling property that renders the heater of our invention ideal for safe, economical and dependable electric heating in general.

The curve of Fig. 9 was plotted from data obtained from a series of actual service tests to determine the temperature changes in a tank of liquid heated with a 500-watt heater. Curve "A" illustrates the magnitude of the temperature changes that occurred when the thermal link 42 was removed from the heater 17. Under identical conditions, and using the same heater with the thermal link 42 attached, more uniform and closer temperature control was obtained, as shown by curve "B." This establishes the importance of the use of the thermal link 42 which is adjustable in position along the metallic sheath 40 of the loop that constitutes the heater 17.

In order to insure the quick heat transfer between the heater 17 and the thermostat, we provide a thermal link 42 which encircles the metallic sheath 40 of the loop constituted by the heater 17 and encircles the thermostat tube 2 as shown more clearly in Fig. 4. Thus the thermal link 42 engages the walls of the metallic sheath 40 and the walls of the thermostat tube 2 and is united therebetween as represented at 43 and 44. This thermal link 42 conductively transmits heat more quickly to the thermostat from the heater 17 than would be the case if the thermostat tube depended upon its response to temperature changes from the temperatures transmitted by the solution into which the thermostat is immersed. The magnitude of temperature surges due to the "on" and "off" operation of the heater is greatly suppressed, resulting in closer temperature control.

The heater of our invention is readily insertable and replaceable in heating position for various applications as heretofore explained. The casing 45 fits over the mounting plate 4 and carries a bull's-eye lens 46 which is aligned with pilot lamp 30 which enables the energized or deenergized condition of the heater to be readily observed with the casing 45 in position. The collar 47 on the end of the casing 45 provides an entrance way for BX conductor for taking power to the heater terminals 33 and 34 on terminal block 10. An aperture 48 in one side of casing 45 permits adjustment of screw 23 to be made in order to selectively adjust the heater to proper control temperature. A calibrated scale 49 on the exterior of the casing 45 as shown in Fig. 10 enables the slotted head of adjusting screw 23 to be adjusted to a predetermined setting for predetermined cut-off temperature.

Wherever in the specification and claims we have used the term "micro-switch" we intend to refer to any electrical contactor in which the contact elements are spacially related under spring or magnetic tension and in which the actuating operating member may effect opening or closing of the contact elements within the exterior of the casing which houses the contact elements by a slight movement against the actuating operating member exteriorly of the casing. This type of micro-switch is now recognized in the art as a reliable circuit controller requiring but slight mechanical movement against the actuating operating member for controlling the position of the contact elements within the micro-switch housing. In the embodiment of our invention herein illustrated the movement required to operate the micro-switch contacts is less than .001 inch, which movement is imparted to the rockable support of the micro-switch and the micro-switch operated by release of contact of operating member 29 against adjusting screw 23 preset for opening the control circuit at the desired operating temperature.

While we have described our invention in certain preferred embodiments, we realize that changes may be made and we desire that it be understood that no limitations upon our claims are intended other than may be imposed by the scope of the appended claims.

What we claim as new and desire to secure by Letters Patent of the United States is as follows:

1. An electric heater comprising a frame structure, a tubular thermostat member supported by said frame structure, an angularly displaceable pivoted support carried by said frame structure, an operating rod disposed within said tubular member and secured at one end to the end of said tubular member and normally abutting at its opposite end with said angularly displaceable pivoted support for rocking said support about its pivot in proportion to the expansion of said tubular thermostat under conditions of temperature change, an abutment member mounted with respect to said frame, an electrical contactor carried by said support and operative to "On" and "Off" position according to the displacement of said displaceable pivoted support with reference to said abutment member, a tubular electric heater looped symmetrically around said thermostat and electrically connected with said electrical contactor, said looped electric heater having side portions extending in substantially parallel spaced relation to said tubular thermostat and a heat conductive metallic band member interconnecting said thermostat member with each side portion of said looped electric heater for conductively transmitting heat from said side portions of the electric heater into said thermostat.

2. An electric heater comprising a frame structure, a thermostat supported by said frame structure, an angularly displaceable pivoted support carried by said frame structure, an operating member controlled by said thermostat and normally abutting at its end with said angularly displaceable pivoted support for rocking said support about its pivot in proportion to the expansion of said thermostat under conditions of temperature change, an adjustable abutment member mounted with respect to said frame, a micro-switch carried by said angularly displaceable pivoted support and operative to "on" and "off" positions according to the displacement of said angularly displaceable pivoted support and the position of said adjustable abutment member, a tubular electrical heater looped around said thermostat and electrically connected with said micro-switch, said looped electric heater having side portions extending in substantially parallel spaced relation to said thermostat and a heat conductive metallic band member interconnecting said thermostat with each side portion of the looped electric heater for conductively transmitting heat from said side portions of the electric heater into said thermostat.

3. An electric heater comprising a frame structure, a looped heater extending from said frame structure for immersion in a fluid, said looped heater having substantially parallel spaced side portions, a thermostat supported by said frame structure and extending adjacent and substantially between the side portions of said looped heater, an operating member associated with said thermostat, control means carried by said frame structure for operation by the operating member of said thermostat for electrically controlling a circuit to said heater, and a thermally conductive link interconnecting said thermostat with said side portions of said looped heater for conductively transferring heat therebetween.

4. An electric heater comprising a frame structure, a looped heater extending from said frame structure for immersion in a fluid, said looped heater having substantially parallel spaced side portions, a thermostat supported by said frame structure and extending adjacent and substantially intermediate the side portions of said looped heater, an operating member associated with said thermostat, control means carried by said frame structure for operation by the operating member of said thermostat for electrically controlling a circuit to said heater, and a thermally conductive metallic strap interconnecting said thermostat and encircling each of the side portions of said looped heater for conductively transferring heat from each of the side portions of said looped heater to said thermostat.

5. An electric heater comprising a frame structure, a looped heater extending from said frame structure for immersion in a fluid, said looped heater having substantially parallel spaced side portions, a thermostat supported by said frame structure and extending adjacent and substantially intermediate the side portions of said looped heater, an operating member associated with said thermostat, control means carried by said frame structure for operation by the operating member of said thermostat for electrically controlling a circuit to said heater, and a thermally conductive metallic band embracing each side of said thermostat and interconnecting said thermostat and the side portions of said looped heater and forming a heat conducting path of predetermined width around the side portions of said looped heater and around the sides of said thermostat for facilitating the transfer of heat from the side portions of said looped heater to said thermostat.

6. An electric heater comprising a frame structure, a longitudinally extending thermostat supported by said frame structure, an electric heater supported by said frame structure and having side portions extending in substantially parallel spaced relation to and substantially around said thermostat, an operating member associated with said thermostat, control mechanism including an electric circuit closing and opening device carried by said frame structure, said operating member being connected with said control mechanism for controlling the opening or closing of an electrical circuit through said circuit closing and opening device to said electric heater, and a heat conducting band member encircling the side portions of said electric heater and embracing said thermostat and interconnected therebetween for establishing a conductive path for transferring heat therebetween.

7. An electric heater comprising a frame structure, a thermostat supported by said frame structure, an electric heater supported by said frame structure and having side portions extending in substantially parallel spaced relation adjacent and substantially around said thermostat, an operating member associated with said thermostat, control mechanism including an electric circuit closing and opening device carried by said frame structure, said operating member actuating the electric circuit closing and opening device of said control mechanism for opening or closing an electrical circuit to said electric heater, an indicator carried by said frame structure and electrically connected with said heater for visibly indicating the energized and de-energized condition of said electric heater and a thermally conductive band encircling the side portions of said electric heater and contacting substantially the entire periphery of the wall of said thermostat throughout the width of said band and connected therebetween to form a surface to surface contact for providing a heat transmission path between each of the side portions of said electric heater and said thermostat.

8. An electric heater comprising a frame structure, a longitudinally extending thermostat supported by said frame structure, an electric heater supported by said frame structure and having side portions extending in spaced positions adjacent and substantially around the end of said thermostat, control mechanism carried by said frame structure, an operating member disposed adjacent said thermostat and arranged to actuate said control mechanism for opening or closing an electrical circuit to said electric heater, an electric indicator lamp connected in parallel with said electric heater and controlled simultaneously with said electric heater by said control mechanism for indicating the energized and de-energized condition of said electric heater and a heat conductive metallic band encircling each of the side portions of said electric heater and establishing thermally conducting contact therewith and extending in surface contact around substantially the entire periphery of said thermostat and united face to face intermediate said thermostat and each of the side portions of said electric heater and constituting a thermal path for the transmission of heat from each of the side portions of said electric heater to said thermostat in a direction from each of the side portions of said electric heater toward said thermostat.

9. An electric heater comprising a frame structure, a longitudinally extending thermostat supported by said frame structure, an electric heater supported by said frame structure and having side portions extending in spaced positions adjacent and substantially around the end of said thermostat, control mechanism carried by said frame structure, an operating member disposed adjacent said thermostat and arranged to actuate said control mechanism for opening or closing an electrical circuit to said electric heater, an adjustment device for said control mechanism, a casing housing said control mechanism and supported by said frame structure and apertured to provide access to said adjustment device through said casing, a calibrated scale carried by said casing and coacting with the adjustment device of said control mechanism within said casing for indicating selected settings of said control mechanism for predetermining the setting of said control mechanism for opening and closing the circuit to said electric heater under control of said thermostat and a thermally conductive band encircling each of the side portions of said heater and embracing substantially the entire periphery of said thermostat and located between the terminus of said electric heater for accelerating the transmission of heat from the side portions of said electric heater to said thermostat.

10. An electric heater comprising a frame structure, a thermostat supported by said frame structure, an angularly displaceable pivoted support carried by said frame structure, an operating member disposed adjacent said thermostat and normally abutting at its end with said angularly displaceable pivoted support for rocking said support about its pivot in proportion to the expansion of said thermostat under conditions of temperature change, an adjustable abutment member mounted with respect to said frame, said adjustable abutment member including an adjusting screw operative externally of said frame structure, a micro-switch carried by said angularly displaceable pivoted support, said micro-switch including an actuating operating member aligned with said adjustable abutment member and operative to "On" and "Off" positions according to the displacement of said displaceable pivoted support, an electrical heater associated with said thermostat and electrically connected in series with said micro-switch whereby the energization thereof is controlled by the relative position of said adjustable abutment member and the actuating operating member of said micro-switch and a thermally conductive slidable band interconnecting said heater and said thermostat and adjustable to a selected position for accelerating the transmission of heat from said heater to said thermostat.

11. An electric heater comprising a frame structure, a thermostat supported by said frame structure, an angularly displaceable pivoted support carried by said frame structure, an operating member disposed adjacent said thermostat and normally abutting at its end with said angularly displaceable pivoted support for rocking said support about its pivot in proportion to the expansion of said thermostat under conditions of temperature change, an adjustable abutment member mounted with respect to said frame, said adjustable abutment member including an adjusting screw operative externally of said frame structure, a micro-switch carried by said angularly displaceable pivoted support, said micro-switch including a spring actuated contactor and an actuating operating member aligned with said adjustable abutment member and operative to "on" and "off" positions according to the displacement of said displaceable pivoted support, an electrical heater associated with said thermostat and electrically connected in series with said micro-switch whereby the energization thereof is controlled by the relative position of said adjustable abutment member and the actuating operating member of said micro-switch, the spring actuated contactor of said micro-switch tending to continuously urge said angularly displaceable pivoted support into abutment with the end of said operating member through said adjustable abutment member and a thermally conductive slidable band interconnecting said heater and said thermostat and adjustable to a selected position for accelerating the transmission of heat from said heater to said thermostat.

12. An electric heater comprising a frame structure, an electric heating element comprising a member looped upon itself with side portions extending in spaced parallel relation and supported by said frame structure, a thermostat supported by said frame structure and extending in spaced substantially parallel relation to and substantially between the side portions of said electric heating element, switch mechanism carried by said frame structure and controlled by said thermostat for controlling the electric circuit to said electric heating element, said electric heating element terminating in a pair of spaced terminals adjacent said frame structure, an indicator lamp having a pair of depending contact members associated with the spaced terminals of said electric heating element for visually indicating the energized or de-energized condition of said electric heating element and a thermally conductive band encircling each of the side portions of said electric heating element and embracing substantially the entire periphery of said thermostat and located between the looped end of said element and the position at which said heating element is supported by said frame structure for accelerating the transfer of heat from the side portions of said element to said thermostat.

13. An electric heater comprising a frame structure carrying a support apertured for the passage of a tubular casing, a heater looped around the end of said tubular casing and having the ends thereof projecting through said support, a thermostat rod disposed in said tubular casing and projecting above said support, a bracket mounted on said frame structure adjacent one side thereof, a pivoted switch support journalled in the said bracket, a microswitch housing mounted on said pivoted switch support and having a switch actuator therein and an adjustable member mounted on said bracket and aligned with the switch actuator of said microswitch housing for moving said switch actuator to on and off position as the microswitch housing is displaced by movement of said pivoted switch support under control of said thermostat rod for controlling circuit connections through said microswitch housing and said heater according to the expansion and contraction of said thermostat rod.

14. An electric heater comprising a frame structure carrying a support apertured for the passage of a tubular casing, a heater looped around the end of said tubular casing and having the ends thereof projecting through said support, a thermostat rod disposed in said tubular casing and projecting above said support, a bracket carried by said frame structure, a pivoted switch bracket support journalled in the said bracket, a microswitch mounted adjacent the end of said pivoted switch housing support in spaced relation to said bracket and having a switch actuator therein, and an adjusting screw device extending through said bracket and aligned with the switch actuator of said microswitch housing for moving said switch actuator to on and off position for controlling circuit connections through said microswitch housing and said heater according to the expansion and contraction of said thermostat rod with respect to said pivoted switch support.

NATHAN MORRIS.
RICHARD L. FEARN.

REFERENCES CITED

The following references are of record in the file of this patent:

UNITED STATES PATENTS

| Number | Name | Date |
|---|---|---|
| 1,662,556 | Woodson | Mar. 13, 1928 |
| 1,907,869 | Raney | May 9, 1933 |
| 1,912,921 | Spencer | June 6, 1933 |
| 1,930,551 | Blashfield | Oct. 17, 1933 |
| 2,039,641 | Fichtner | May 5, 1936 |
| 2,088,728 | Stranszky | Aug. 3, 1937 |
| 2,112,137 | Brach | Mar. 22, 1938 |
| 2,163,801 | Newell | June 27, 1939 |
| 2,258,835 | Williams | Oct. 14, 1941 |
| 2,325,377 | Dickie | July 27, 1943 |
| 2,358,732 | Otto | Sept. 19, 1944 |
| 2,369,932 | Allen | Feb. 20, 1945 |